US008917787B2

(12) United States Patent
Gaur

(10) Patent No.: US 8,917,787 B2
(45) Date of Patent: Dec. 23, 2014

(54) SYSTEMS AND METHODS FOR CREATING A DOWNLINK PRECODE FOR COMMUNICATION SYSTEM WITH PER-ANTENNA POWER CONSTRAINTS

(75) Inventor: Sudhanshu Gaur, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 833 days.

(21) Appl. No.: 13/069,093

(22) Filed: Mar. 22, 2011

(65) Prior Publication Data

US 2012/0243631 A1 Sep. 27, 2012

(51) Int. Cl.
*H04B 7/02* (2006.01)
*H04B 7/04* (2006.01)

(52) U.S. Cl.
CPC ............ *H04B 7/0447* (2013.01); *H04B 7/0465* (2013.01)
USPC ......................................................... 375/267

(58) Field of Classification Search
CPC .............................. H04B 7/0447; H04B 7/0465
USPC .................. 375/259, 260, 267, 295, 296, 316
See application file for complete search history.

(56) References Cited

U.S. PATENT DOCUMENTS

| | | | |
|---|---|---|---|
| 6,862,271 B2 | 3/2005 | Medvedev et al. | |
| 6,940,917 B2 | 9/2005 | Menon et al. | |
| 7,194,040 B2 | 3/2007 | Menon et al. | |
| 2007/0249296 A1 | 10/2007 | Howard et al. | |
| 2010/0150265 A1* | 6/2010 | Wu et al. | 375/296 |
| 2012/0140848 A1* | 6/2012 | Lin et al. | 375/296 |

FOREIGN PATENT DOCUMENTS

| | | |
|---|---|---|
| CN | 101427485 A1 | 5/2009 |
| WO | 2007-127744 A1 | 11/2007 |
| WO | 2009/002078 A2 | 12/2008 |
| WO | 2010/005988 A2 | 1/2010 |

OTHER PUBLICATIONS

I. Emre Telatar, "Capacity of Multi-antenna Gaussian Channels", Eur. Trans. Telecomm. ETT, Nov. 1999, 28 pages, vol. 10, No. 6.
Mai Vu, "MISO Capacity with Per-Antenna Power Constraint", Mar. 8, 2010, 15 pages, arXiv:1003.1738v1, Department of Electrical and Computer Engineering, McGill University, Montreal, H3A2A7.
Wei Yu, et al., "Transmitter Optimization for the Multi-Antenna Downlink With Per-Antenna Power Constraints", IEEE Transactions on Signal Processing, Jun. 2007, pp. 2646-2660, vol. 55, No. 6.
Shuying Shi, et al., "Per-Antenna Power Constrained Rate Optimization for Multiuser MIMO Systems", International ITG Workshop on Smart Antennas (WSA), 2008, pp. 270-277.
M. Codreanu, et al., "MIMO Downlink Weighted Sum Rate Maximization with Power Constraints per Antenna Groups", IEEE VTC Spring, 2007, pp. 2048-2052.
Chinese office action mailed on May 29, 2014, Chinese Application No. 201210077611.7.

* cited by examiner

*Primary Examiner* — Kevin M Burd
(74) *Attorney, Agent, or Firm* — Procopio, Cory, Hargreaves & Savitch LLP

(57) ABSTRACT

Systems and methods for a downlink precode filter directed towards both wired and wireless MIMO communication systems. Systems and methods of the invention can provide close to optimal capacity (similar to the water-filling solution) while requiring power amplifiers associated with transmit antennas to operate at a fixed power level. In particular, systems and methods of this invention can improve the performance of MIMO wireless devices such as 802.11n, WiMax, LTE, LTE-Advanced etc.

17 Claims, 10 Drawing Sheets

SYSTEMS AND METHODS FOR CREATING A DOWNLINK PRECODE FOR COMMUNICATION SYSTEM WITH PER-ANTENNA POWER CONSTRAINTS

TECHNICAL FIELD

The present application is directed generally towards communication systems, and more specifically towards creating a downlink precode filter for communication systems with per-antenna power constraints.

BACKGROUND ART

In a Multiple Input Multiple Output (MIMO) communication system, optimal capacity is typically achieved using the well known 'Water-filling' solution. This practice achieves optimal channel capacity by distributing total available transmit power to transmit antennas according to the Water-filling solution. Usually, this results in unequal power distribution among different transmit antennas and doesn't guarantee that allocated power is within the linear range of the power amplifier associated with the transmit antenna.

A typical MIMO communication system involves multiple antennas, say N, at the transmitter and multiple antennas, say M, at the receiver. Such a system can be used to transmit a maximum of L independent streams where L is a positive integer such that $1 \leq L \leq \min(M,N)$. Each transmitted stream is referred to as a 'Layer' and corresponds to a symbol element in input symbol vector x. The input vector x is processed using a precoder filter W and the output is matched to different transmit antennas for RF transmission as shown in FIG. 1 and FIG. 2.

FIG. 3 shows a typical MIMO communication system utilizing Water-filling based precoder resulting in varying power allocation to transmit antennas. For an L-layer MIMO system, lets define the following:

Input symbol, $$X = \begin{bmatrix} x_1 \\ \ldots \\ x_L \end{bmatrix} \quad (1)$$

Precoder matrix, $$w = \begin{bmatrix} w_1 \\ \ldots \\ w_N \end{bmatrix} = \begin{bmatrix} w_{11} & \ldots & w_{1L} \\ & \ldots & \\ w_{N1} & \ldots & w_{NL} \end{bmatrix} \quad (2)$$

where $w_k = [w_{k1} \ldots w_{kL}]$.

Transmit vector, $$y = \begin{bmatrix} y_1 \\ \ldots \\ y_N \end{bmatrix} = wx \quad (3)$$

Transmit symbol at $k^{th}$ antenna, $$y_k = w_k X \quad (4)$$

A conventional water-filling based precoder is designed in the following manner:

a) Perform the SVD decomposition of the channel matrix: $H = USV^H$ (where U and V are left and right singular vector matrices, respectively; and S is a diagonal matrix)

b) For L layer transmission, choose L column vectors of V that correspond to largest singular values of channel matrix H. Let this matrix be denoted by $V_L = [v_1 \ v_2 \ldots v_L]$, where $v_k$ denotes the $k^{th}$ column vector of matrix V.

c) Construct an L×L diagonal matrix $\Lambda$ such that $(i,i)^{th}$ element denotes the power allocated to the $i^{th}$ singular mode. Water-filling method can generate the optimal power allocation matrix $\Lambda$ such that the sum of diagonal elements is less than or equal to the total transmit power $P_T$.

d) Precoder matrix is constructed as: $W = V_L * \mathrm{sqrt}(\Lambda)$

The transmit power allocated to the $k^{th}$ antenna is represented by the $k^{th}$ diagonal entry of the matrix $WW^H$. Usually, such a construction of W results in unequal power allocations to different transmission antennas as shown in FIG. 3.

In the recent past, there has been some work related to more practical precoder design where each antenna has power constraint P as shown in FIG. 4. However, these results are academic in nature with huge computational complexity as no closed-form analytical solutions exist.

CITATION LIST

E. Telatar, "Capacity of multi-antenna Gaussian channels," Eur. Trans. Telecomm. ETT, vol. 10, no. 6, pp. 585-596, November 1999.

M. Vu, "MISO capacity with Per-Antenna Power Constraint", arXiv:1003.1738v1, Mar. 8, 2010.

W. Yu and T. Lan, "Transmitter optimization for the multi-antenna downlink with per-antenna power constraints," IEEE Transactions on Signal Processing, vol. 55, no. 6, pp. 2646-2660, 2007.

S. Shi, M. Schubert, and H. Boche, "Per-antenna power constrained rate optimization for multiuser MIMO systems," in International ITG Workshop on Smart Antennas (WSA), 2008, pp. 270-277.

M. Codreanu, A. Tolli, M. Juntti, and M. Latva-aho, "MIMO Downlink Weighted Sum Rate Maximization with Power Constraints per Antenna Groups," in IEEE VTC Spring, 2007, pp. 2048-2052.

SUMMARY OF THE INVENTION

Technical Problem

Given the foregoing background, there is a need for new methods and systems that substantially obviate the aforementioned problems associated with known conventional techniques for communication systems. Specifically, there is a need to ensure equal power distribution among different transmit antennas and guarantee that allocated power is within the linear range of the power amplifier associated with the transmit antenna.

Solution to the Problem

The inventive methodology is directed to methods and systems that substantially obviate one or more of the above and other problems associated with the known conventional techniques for communication systems.

Aspects of the present invention include a method which may involve applying a precode filter to at least one antenna in a transmitter, wherein the precode filter is represented by the equation $$W = \sqrt{\frac{P}{L}} V_{L\text{-}phase}.$$

In the equation, P represents power allocation; L represents a number of transmission layers; $V_{L\text{-}phase}$ represents a matrix where the $(i,j)^{th}$ element of $V_{L\text{-}phase}$ is equivalent to the phase of $(i,j)^{th}$ complex element in $V_L$, wherein $V_L$ is based on a right singular matrix derived from channel matrix H. Channel matrix H is a matrix representing channel gain between at least one antenna at the transmitter and at least one antenna at a receiver.

Aspects of the present invention further include a transmitter which may include at least one antenna and a precode filter applied to the least one antenna, wherein the precode filter is represented by the equation $$W = \sqrt{\frac{P}{L}} V_{L\text{-}phase}.$$

Aspects of the present invention further include a receiver, which may include at least one antenna transmitting information to a transmitter for constructing a precode filter, wherein the precode filter is represented by the equation $$W = \sqrt{\frac{P}{L}} V_{L\text{-}phase}.$$

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

Advantageous Effects of the Invention

The present invention improves on the Water-Filling Solution by providing close to optimal capacity (similar to the water-filling solution) while requiring power amplifiers associated with transmit antennas to operate at a fixed power level.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DESCRIPTION OF EMBODIMENTS

In the following detailed description of exemplary embodiments, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Embodiments of the invention are based on SVD decomposition of the channel matrix. The right singular matrix that results from SVD decomposition is used as a precoder filter and power is allocated based on the strength of singular modes (i.e. singular values of the channel matrix).

Embodiments of the invention provide an alternative design for the conventional MIMO precoder, which allocates equal power to all the transmit antennas. Such embodiments result in insignificant loss in capacity while meeting the practical requirements related to the linearity of power amplifiers.

Figure 1:
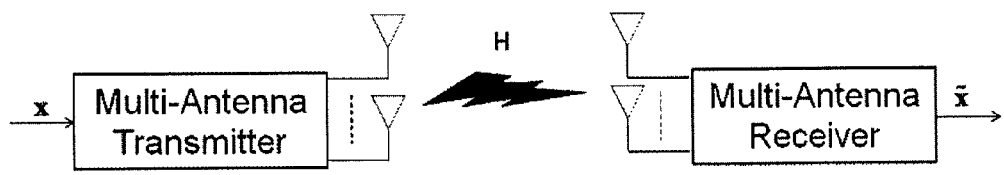
FIG. 1 illustrates an example of an application of a precoder filter W to a transmission system.
Figure 2:
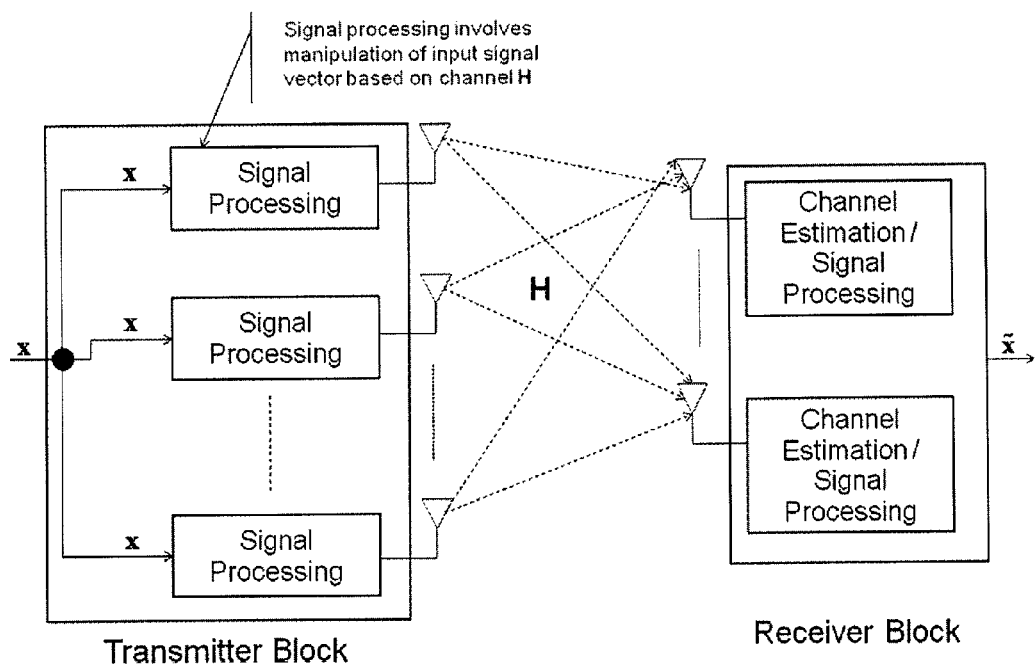
FIG. 2 illustrates another example of an application of a precode filter to a transmission system.
Figure 3:
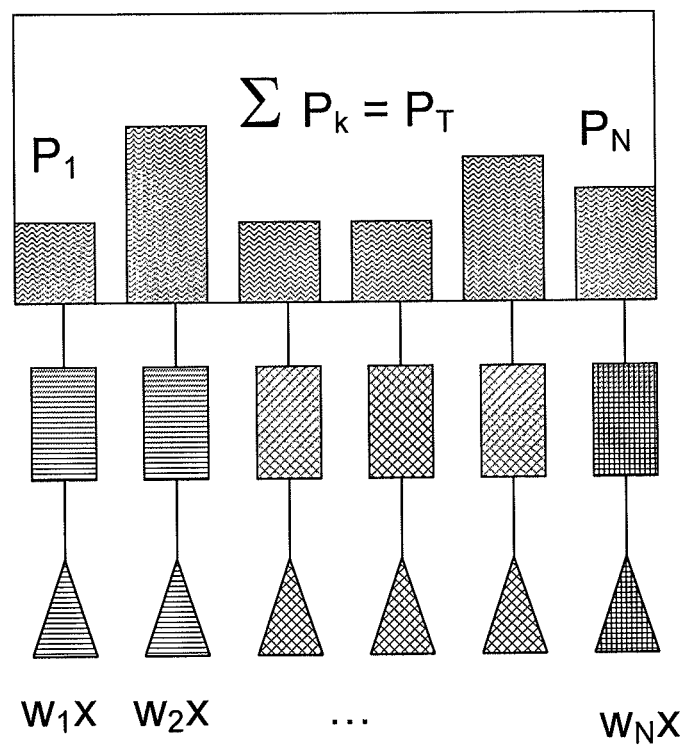
FIG. 3 illustrates a MIMO communication system utilizing a Water-filling based precoder.
Figure 4:
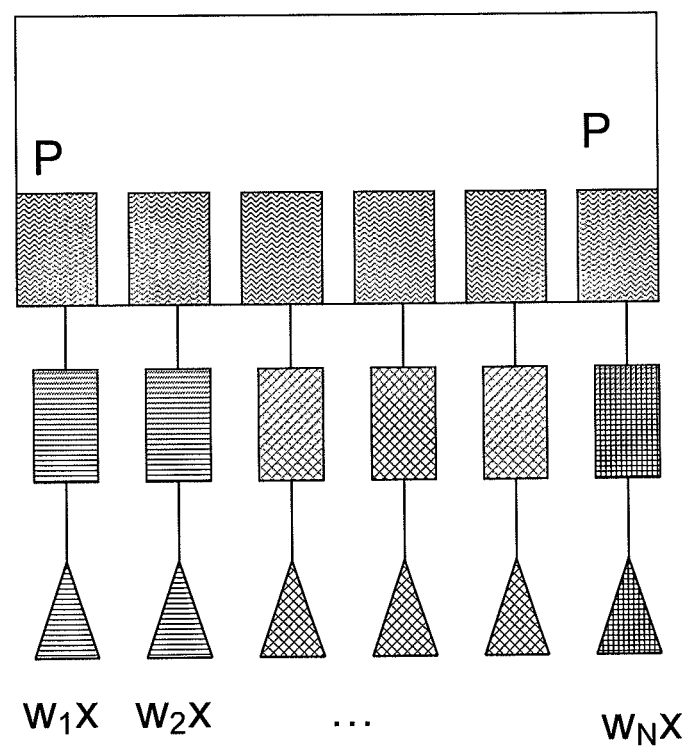
FIG. 4 illustrates a MIMO communication system wherein each antenna has a power constraint P.
Figure 5:
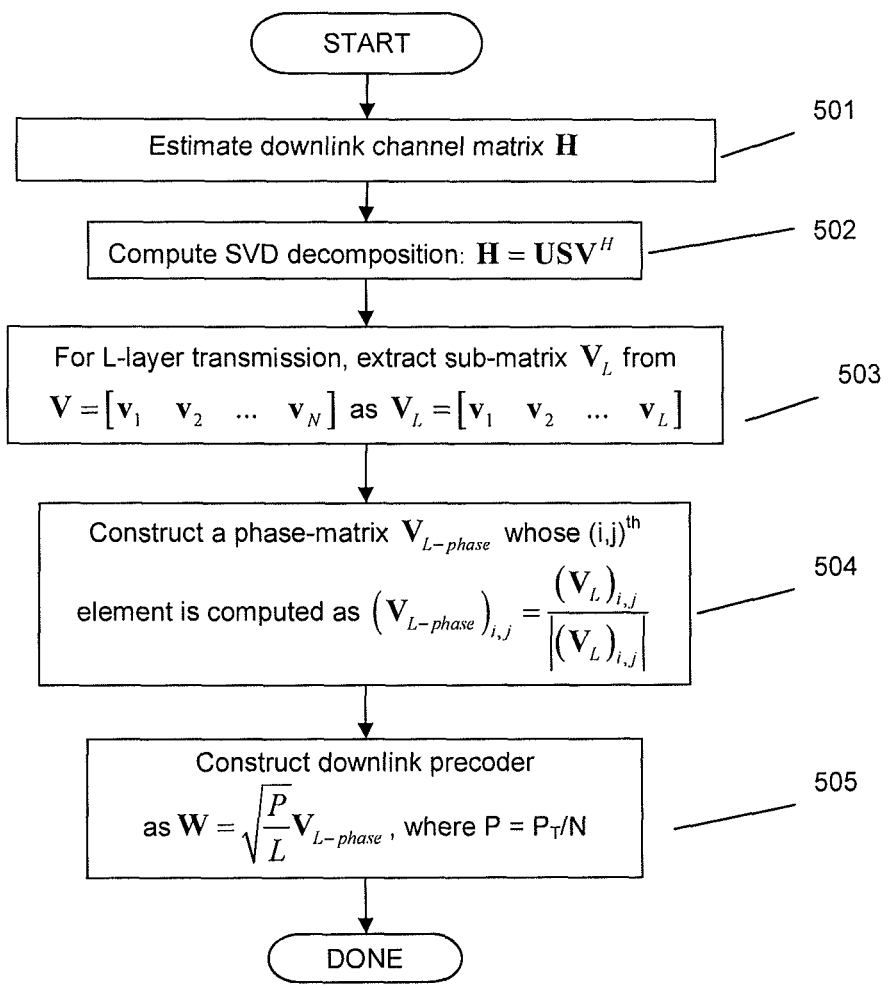
FIG. 5 illustrates an example of a flow chart of a first method according to an embodiment of the invention.

In contrast to conventional schemes which utilize the right singular matrix (V) and 'Water-filling' to design the downlink precoder (W), some embodiments of the invention utilize the phases of the entries in the right singular matrix (V) to design W, as described below and as shown in the several steps of the flowchart illustrated in FIG. 5.

Step 501: Estimate the downlink channel matrix H.

Step 502: Perform the SVD decomposition of the channel matrix H to obtain right singular matrix V.

Step 503: For L layer transmission, choose L column vectors of V that correspond to largest singular values of channel matrix H. Let this matrix be denoted by $V_L = [v_1\ v_2\ \ldots\ v_L]$, where $v_k$ denotes the $k^{th}$ column vector of matrix V.

Step 504: Construct a matrix $V_{L\text{-}phase}$ of the same size as $V_L$, where $(i,j)^{th}$ element of $V_{L\text{-}phase}$ denotes the phase of the $(i,j)^{th}$ complex element in $V_L$.

Step 505: Construct precoder filter as W=sqrt(P/L)* $V_{L\text{-}phase}$, where sqrt(.) denotes the square root of its argument and P is the maximum power allowed at each transmit antenna. If the MIMO transmitter has a total available power $P_T$, then $P=P_T/N$.

In the following description, the term "Layer" refers to number of independent data steams transmitted by the MIMO transmitter or by the transmitter in a communication system.

System Configuration

In this section, key ideas involved in embodiments of the invention and the system utilized by embodiments of the invention are described herein. Two algorithms are proposed that outline the steps required to design a MIMO Downlink Precoder which meets the power constraint for each antenna (Per-Antenna power constraint).

Initialization Procedure—An initialization procedure can be utilized for constructing the representative channel gain matrix to be used for the construction of the precode filter.

Channel Estimation at Receiver: The channel gain matrix H has N columns and M rows. The $(i,j)^{th}$ element of H represents the complex channel gain between the $j^{th}$ transmitter antenna and $i^{th}$ receiver antenna. These complex gains can be computed at the receiver by means of Pilots. To estimate the channel between the $k^{th}$ transmit antenna and all receive antennas, the $k^{th}$ transmit antenna sends out a Pilot symbol which is pre-known at all receive antennas. This enables the receiver to compute the complex channel gain between the $k^{th}$ transmit antenna. This procedure is repeated for all transmit antennas in a sequential manner (i.e. 1 transmission per time slot).

Channel Feedback to Transmitter: There are several ways in which a transmitter can obtain the channel gain matrix for constructing the precode filter.

The receiver sends the full channel matrix H to the transmitter using a feedback path. Subsequently, the receiver does some processing on the channel matrix H and sends the resultant matrix $H_{eff}$ to the transmitter using the feedback path. Then, the receiver does some processing on the channel matrix H and sends channel specific information in few bits utilizing codebooks.

In a Time-Division (TD) system, the transmitter can determine the channel gain matrix by using channel reciprocity.

Two methods for constructing the precode filter are presented. The two methods have varying complexity. The first method is based on SVD decomposition of the channel matrix H and gives the best performance. The second method does not require SVD decomposition and as a result experiences some performance loss.

First Exemplary Method—SVD-Based

The following steps list the key idea of the SVD-based method to design the Downlink precoder W:

a) Perform the SVD decomposition of the channel matrix H as: $H=USV^H$ (where U and V are left and right singular vector matrices, respectively; and S is a diagonal matrix)
b) For L layer transmission, choose L column vectors of V that correspond to largest singular values of channel matrix H. Let this matrix be denoted by $V_L=[v_1 \ v_2 \ldots v_L]$, where $v_k$ denotes the $k^{th}$ column vector of matrix V.
c) Construct a matrix $V_{L-phase}$ of the same size as $V_L$ where $(i,j)^{th}$ element of $V_{L-phase}$ denotes the phase of the $(i,j)^{th}$ complex element in $V_L$. That is set $(i,j)^{th}$ entry of $V_{L-phase}$ as:

$$(V_{L-phase})_{i,j} = \frac{(V_L)_{i,j}}{|(V_L)_{i,j}|},$$

where |.| denotes the absolute value of its argument.

d) Construct precoder filter as $$W = \sqrt{\frac{P}{L}} \ V_{L-phase},$$

where P is the maximum power allowed at each transmit antenna. If the MIMO transmitter has a total available power $P_T$, then $P=P_T/N$.

The steps (a)-(d) can be executed partially or fully at either the transmitter or the receiver.

Figure 6:
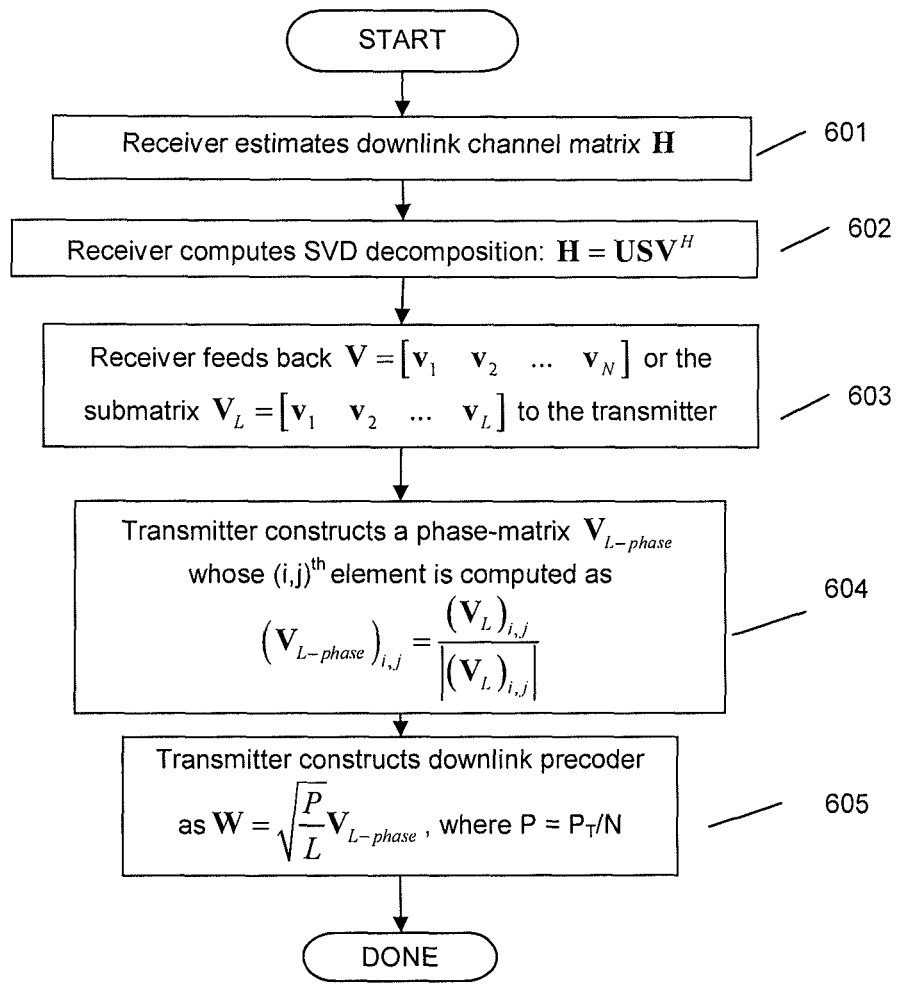
FIG. 6 illustrates an example of an implementation of the first method according to an embodiment of the invention.

FIG. 6 illustrates a flowchart representing one possible implementation of the first method.

Step 601: Receiver estimates downlink channel matrix H.

Step 602: Receiver performs the SVD decomposition of the channel matrix H as: $H=USV^H$ Step 603: Receiver sends right singular matrix V to the Transmitter either explicitly or via codebook methods. It may either send full matrix V or a subset $V_L$ consisting of L column vectors corresponding to largest singular values of H. Let this matrix be denoted by $V_L=[v_1 \ v_2 \ldots v_L]$, where $v_k$ denotes the $k^{th}$ column vector of matrix V.

Alternatively, for an L layer transmission, Transmitter may also choose L column vectors of V that correspond to largest singular values of channel matrix H.

Step 604: Transmitter constructs a matrix $V_{L-phase}$ of the same size as $V_L$ where $(i,j)^{th}$ element of $V_{L-phase}$ denotes the phase of the $(i,j)^{th}$ complex element in $V_L$. That is, set $(i,j)^{th}$ entry of $V_{L-phase}$ as:

$$(V_{L-phase})_{i,j} = \frac{(V_L)_{i,j}}{|(V_L)_{i,j}|},$$

where |.| denotes the absolute value of its argument.

Step 605: Transmitter constructs downlink precoder filter as $$W = \sqrt{\frac{P}{L}} \ V_{L-phase}$$

The receiver may employ techniques other than SVD decomposition to compute right singular matrix V.

Figure 7:
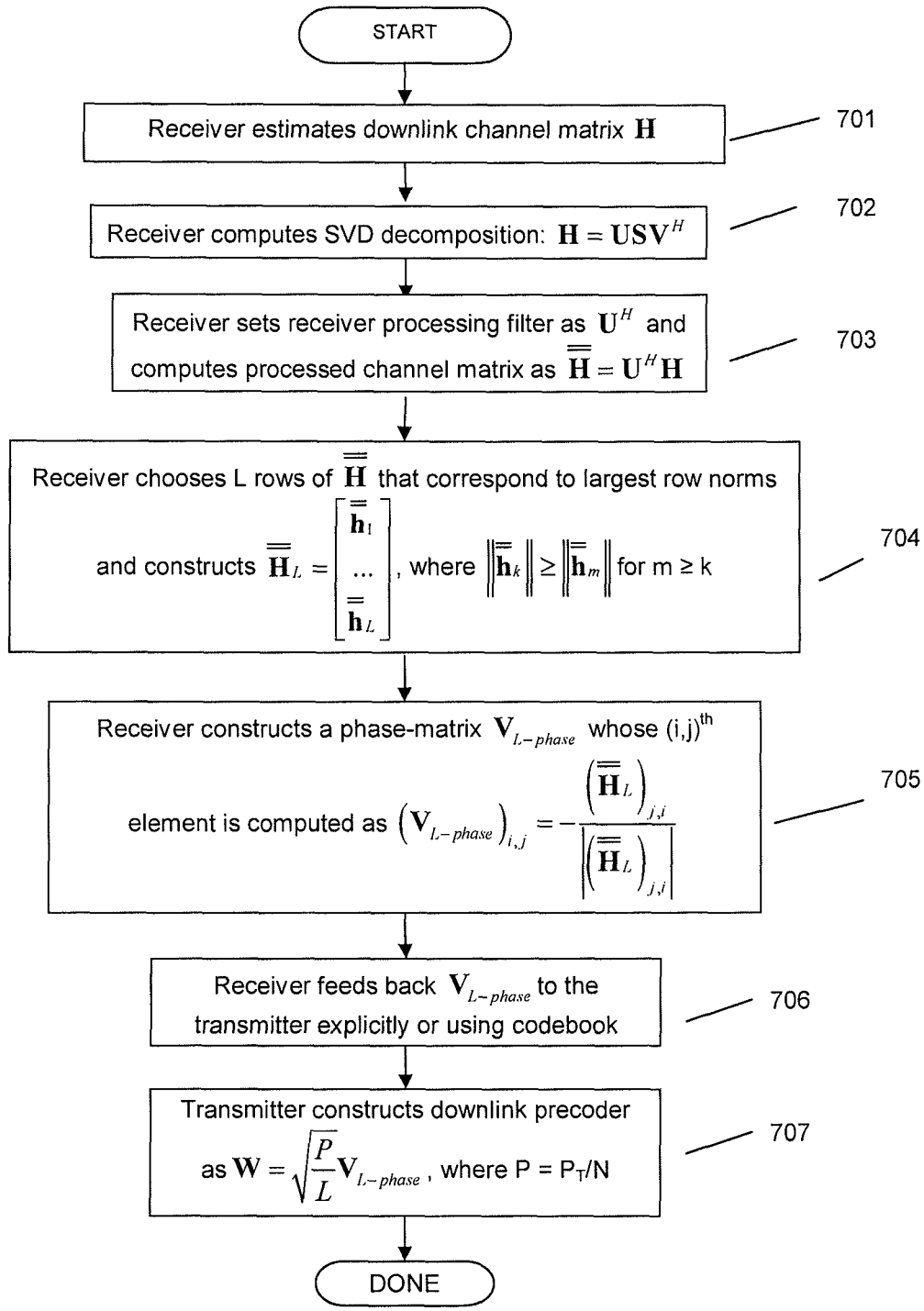
FIG. 7 illustrates another implementation of the first method according to an embodiment of the invention.

FIG. 7 illustrates another possible implementation of the first method.

Step 701: Receiver estimates downlink channel matrix H.

Step 702: Receiver performs the SVD decomposition of the channel matrix H as: $H=USV^H$ Step 703: Receiver obtains processed channel matrix $\overline{H}=U^H H$ Step 704: For L layer transmission, Receiver chooses L rows of $\overline{H}$ that correspond to largest row norms and constructs $$\overline{H}_L = \begin{bmatrix} \overline{h}_1 \\ \dots \\ \overline{h}_L \end{bmatrix},$$

where $\overline{h}_k$ denotes the $k^{th}$ row vector of matrix $\overline{H}$. Here $\overline{h}_1$ has the largest row-norm, followed by $\overline{h}_2$ and so on.

Step 705: Receiver construct a matrix $V_{L\text{-}phase}$ whose $(i,j)^{th}$ element denotes the negative phase of the $(j,i)^{th}$ complex element in $\overline{H}_L$, that is $$(V_{L\text{-}phase})_{i,j} = -\frac{(\overline{H}_L)_{j,i}}{|(\overline{H}_L)_{j,i}|}$$

Step 706: Receiver sends matrix $V_{L\text{-}phase}$ to the Transmitter either explicitly or via codebook method represented by few bits.

Step 707: Transmitter constructs downlink precoder as $$W = \sqrt{\frac{P}{L}} V_{L\text{-}phase}$$

Second Exemplary Method—No SVD Required

Figure 8:
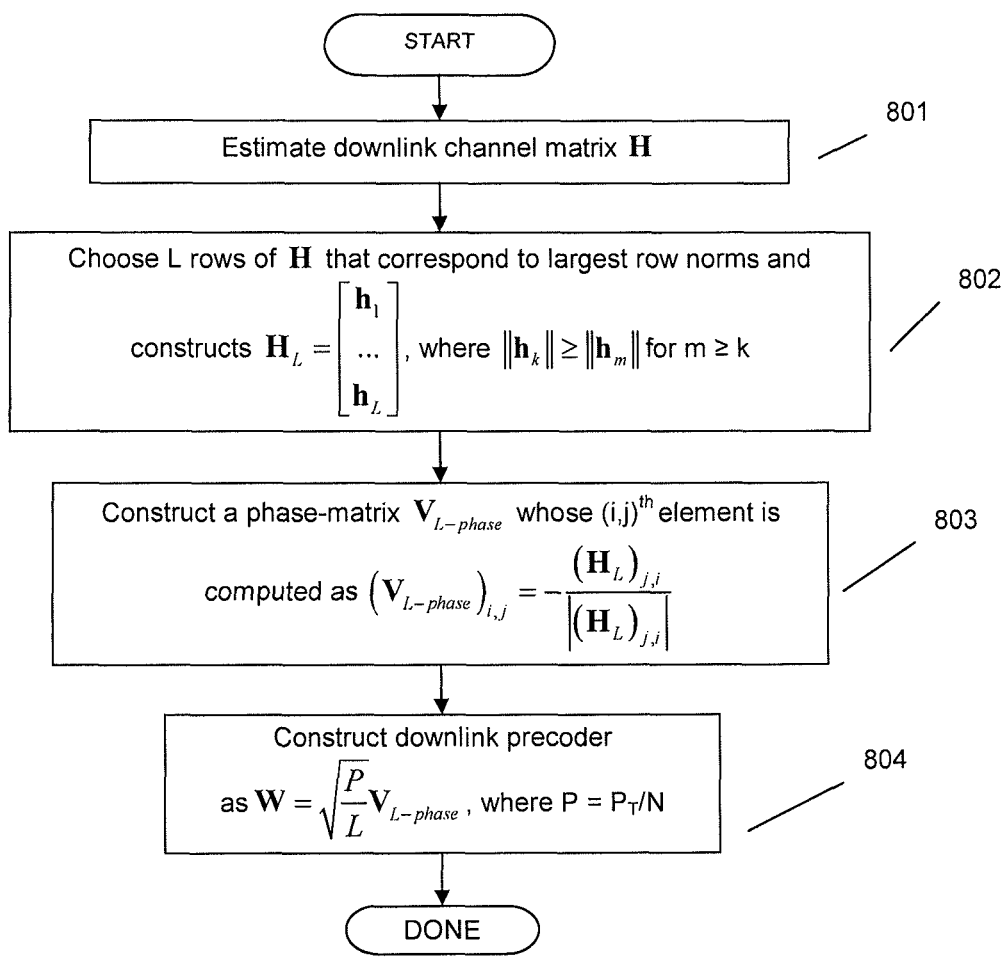
FIG. 8 illustrates an example of a flow chart of a second method according to an embodiment of the invention.

FIG. 8 illustrates a second method which does not require SVD.

Step 801: Estimate downlink channel matrix H.

Step 802: For L layer transmission, chooses L rows of H with the largest row-norms. Let these rows be denoted by another matrix $H_L$ as $$H_L = \begin{bmatrix} h_1 \\ \dots \\ h_L \end{bmatrix},$$

where $h_1$ has the largest row-norm followed by $h_2$ and so on.

Step 803: Construct a matrix $V_{L\text{-}phase}$ whose $(i,j)^{th}$ element represents the negative phase of the $(j,i)^{th}$ complex element in $H_L$ defined as $$(V_{L\text{-}phase})_{i,j} = -\frac{(H_L)_{j,i}}{|(H_L)_{j,i}|}$$

Step 804: Construct downlink precoder as $$W = \sqrt{\frac{P}{L}} V_{L\text{-}phase}$$

Steps 801-804 can be executed in partial or full at the transmitter or the receiver.

Figure 9:
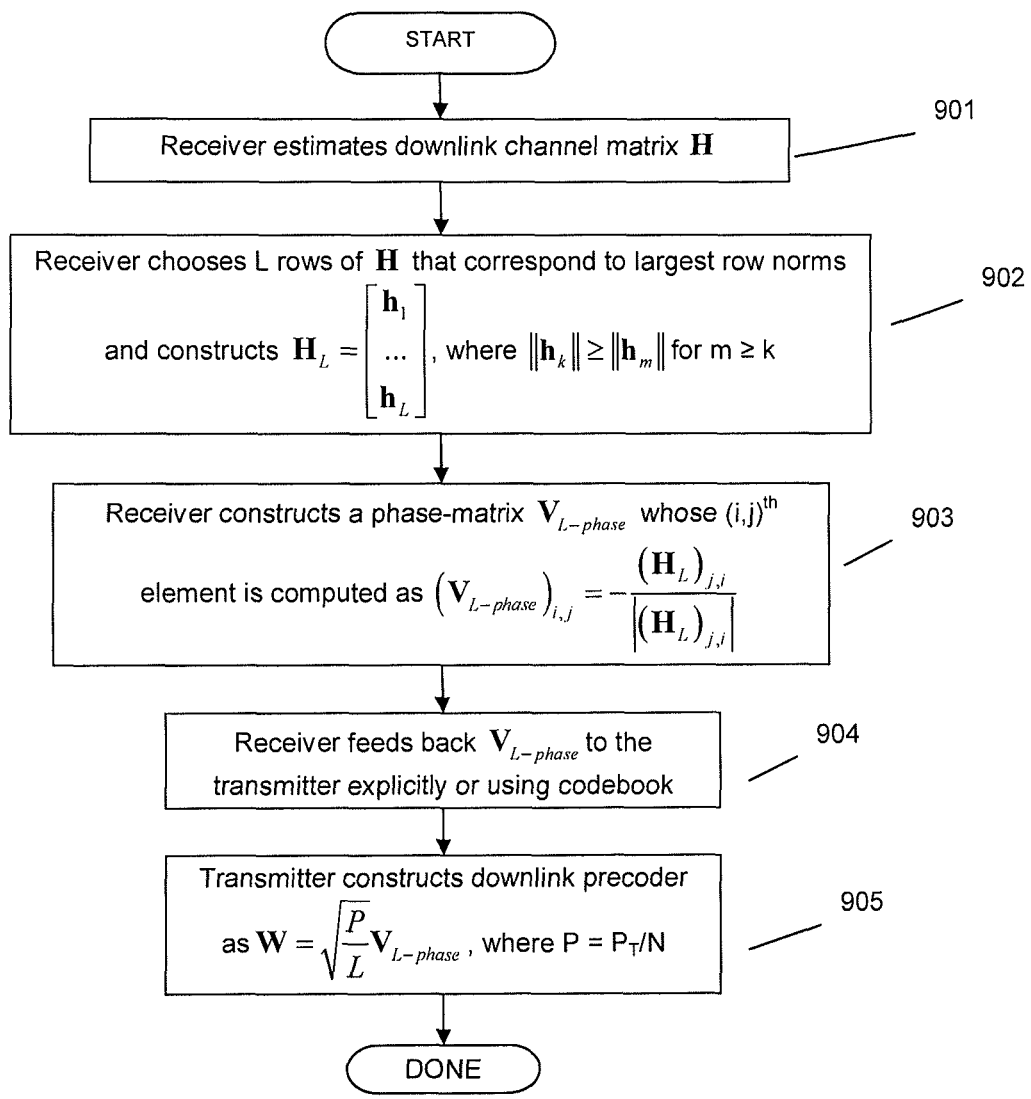
FIG. 9 illustrates an example of an implementation of the second method according to an embodiment of the invention.

FIG. 9 illustrates one possible implementation of the second method.

Step 901: Receiver estimates downlink channel matrix H.

Step 902: For an L layer transmission, Receiver chooses L rows of H with the largest row-norms. Let these rows be denoted by another matrix $H_L$ as $$H_L = \begin{bmatrix} h_1 \\ \dots \\ h_L \end{bmatrix},$$

where $h_1$ has the largest row-norm followed by $h_2$ and so on.

Step 903: Receiver constructs a matrix $V_{L\text{-}phase}$ whose $(i,j)^{th}$ element represents the negative phase of the $(j,i)^{th}$ complex element in $H_L$ defined as $$(V_{L\text{-}phase})_{i,j} = -\frac{(H_L)_{j,i}}{|(H_L)_{j,i}|}$$

Step 904: Receiver sends matrix $V_{L\text{-}phase}$ to the Transmitter either explicitly or via codebook method represented by few bits.

Step 905: Transmitter constructs a downlink precoder as $$W = \sqrt{\frac{P}{L}} V_{L\text{-}phase}$$

Figure 10:
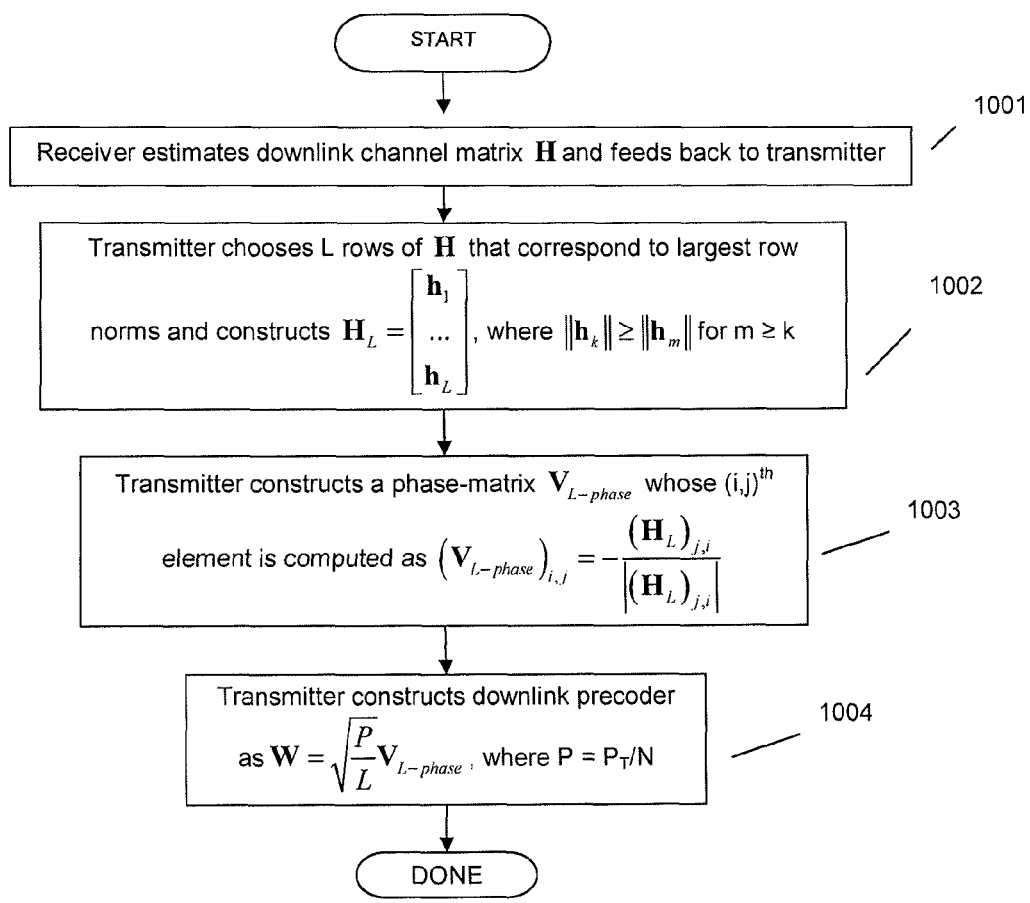
FIG. 10 illustrates another alternative implementation of the second method according to an embodiment of the invention.

FIG. 10 illustrates another possible implementation of the second method.

Step 1001: Receiver sends the full channel matrix H to the Transmitter via feedback channel.

Step 1002: For L layer transmission, Transmitter chooses L rows of H with the largest row-norms. Let these rows be denoted by another matrix $H_L$ as $$H_L = \begin{bmatrix} h_1 \\ \dots \\ h_L \end{bmatrix},$$

where $h_1$ has the largest row-norm followed by $h_2$ and so on.

Step 1003: Transmitter constructs a matrix $V_{L\text{-}phase}$ whose $(i,j)^{th}$ element represents the negative phase of the $(j,i)^{th}$ complex element in $H_L$ defined as $$(V_{L\text{-}phase})_{i,j} = -\frac{(H_L)_{j,i}}{|(H_L)_{j,i}|}$$

Step 1004: Transmitter constructs a downlink precoder as $$W = \sqrt{\frac{P}{L}} V_{L\text{-}phase}$$

Figure 11:
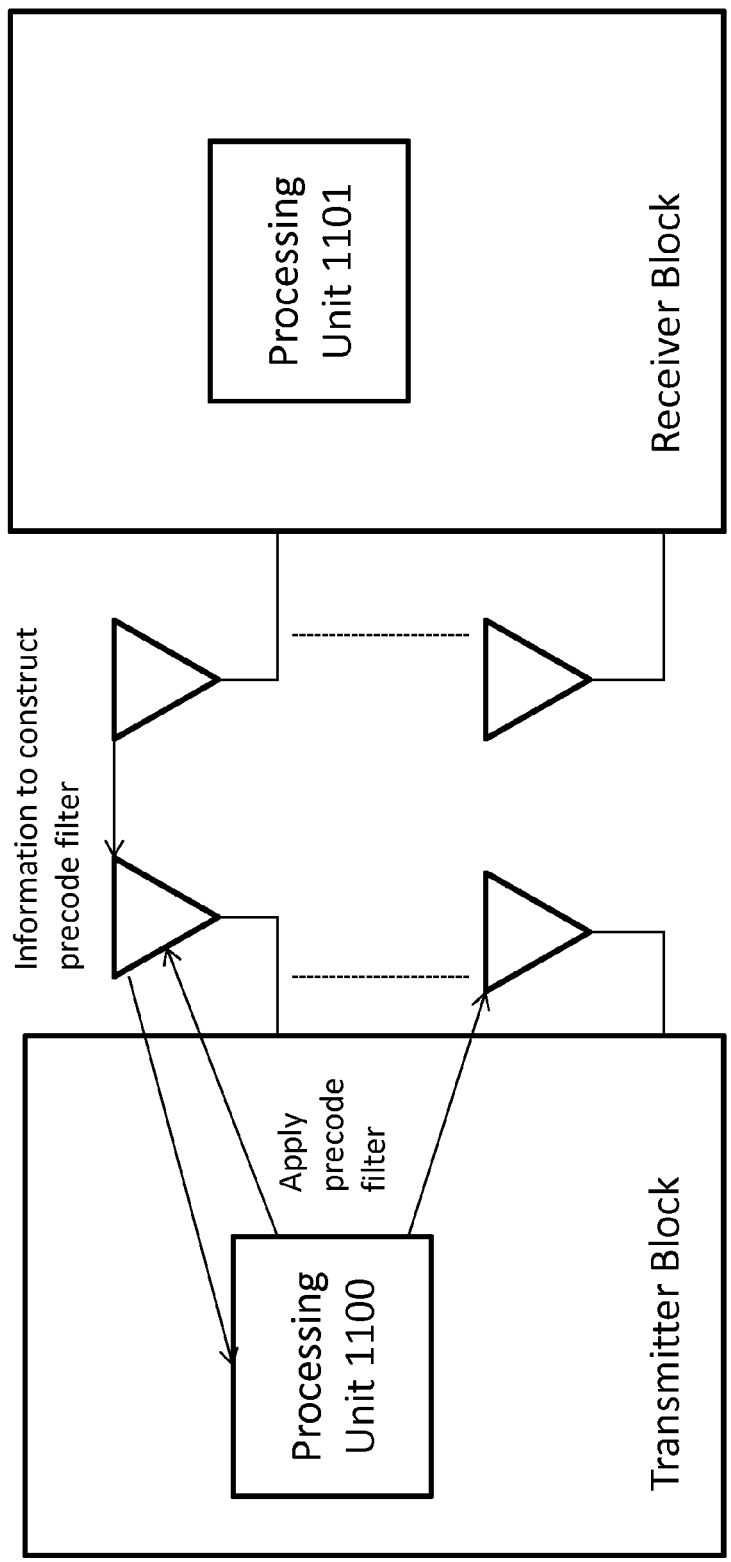
FIG. 11 illustrates an example implementation of a transmitter and a receiver, in accordance with embodiments of the invention.

FIG. 11 illustrates an example implementation of a transmitter and a receiver in accordance with embodiments of the invention. The transmitter block and receiver block may have respective processing unites 1100, 1101 which are implemented by hardware elements (e.g. one or more processors). Processing unit 1101 of the receiver block may be configured to construct information for transmitting to a transmitter for constructing precode filter W, based on implementations as described with respect to FIGS. 5-10. The information to construct the precode filter is transmitted to the transmitter block through one or more antennas of the receiver block.

Based on the received information, processing unit 1100 of the transmitter block is configured to construct precode filter W represented by the equation $$W = \sqrt{\frac{P}{L}} V_{L\text{-}phase}$$

and as described with respect to FIGS. 5-10. The processing unit 1100 of the transmitter block is configured to apply the precode filter W to one or more antennas of the transmitter.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result.

Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the invention will be apparent to those skilled in the art from consideration of the specification and practice of the invention disclosed herein. Various aspects and/or components of the described embodiments may be used singly or in any combination in a communication system. It is intended that the specification and examples be considered as exemplary only, with a true scope and spirit of the invention being indicated by the following claims.

What is claimed is:

1. A method, comprising:
applying a precode filter W to at least one antenna in a transmitter, wherein the precode filter is represented by the equation $$W = \sqrt{\frac{P}{L}} V_{L\text{-}phase}$$

wherein:
P: power allocation;
L: number of transmission layers;
$V_{L\text{-}phase}$: a matrix wherein $(i, j)^{th}$ element of $V_{L\text{-}phase}$ is equivalent to phase of $(i, j)^{th}$ complex element in $V_L$, wherein $V_L$ is based on a right singular matrix derived from channel matrix H;
wherein channel matrix H is a matrix representing channel gain between at least one antenna at the transmitter and at least one antenna at a receiver.

2. The method of claim 1, wherein $V_{L\text{-}phase}$ is generated from a process comprising:
performing a SVD decomposition of the channel matrix H as $H = USV^H$, wherein U and V are left and right singular vector matrices, respectively, wherein S is a diagonal matrix and wherein $V_L$ is either equivalent to V or a subset derived from V; and
constructing the matrix $V_{L\text{-}phase}$ where the $(i,j)^{th}$ element of $V_{L\text{-}phase}$ denotes the phase of the $(i,j)^{th}$ complex element in $V_L$.

3. The method of claim 2, wherein $V_L$ is a subset of V comprising L column vectors corresponding to largest singular values of H.

4. The method of claim 1, wherein $V_{L\text{-}phase}$ is generated from a process comprising:
creating a matrix $H_L$ from selecting L rows of H with the largest row-norms; and constructing the matrix $V_{L\text{-}phase}$ where the $(i,j)^{th}$ element of $V_{L\text{-}phase}$ represents the negative phase of the $(j,i)^{th}$ complex element in $H_L$.

5. The method of claim 1, wherein $V_{L\text{-}phase}$ is generated from a process comprising:
form a processed channel matrix $H=U^H H$;
creating a matrix $H_L$ from selecting L rows of H with largest row norms; and
constructing the matrix $V_{L\text{-}phase}$ where the $(i,j)^{th}$ element of $V_{L\text{-}phase}$ represents the negative phase of the $(j,i)^{th}$ complex elements in $H_L$.

6. The method of claim 1, wherein the transmitter constructs the precode filter.

7. A transmitter, comprising:
at least one antenna; and
a processor configured to apply a precode filter W to the least one antenna, wherein the precode filter is represented by the equation $$W = \sqrt{\frac{P}{L}} V_{L\text{-}phase};$$

wherein:
P: power allocation;
L: number of transmission layers;
$V_{L\text{-}phase}$: a matrix wherein $(i,j)^{th}$ element of $V_{L\text{-}phase}$ is equivalent to phase of $(i,j)^{th}$ complex element in $V_L$, wherein $V_L$ is based on a right singular matrix derived from channel matrix H;
wherein channel matrix H is a matrix representing channel gain between the at least one antenna at the transmitter and at least one antenna at a receiver.

8. The transmitter of claim 7, wherein the processor is configured to generate $V_{L\text{-}phase}$ by a process comprising:
performing a SVD decomposition of the channel matrix H as $H=USV^H$, wherein U and V are left and right singular vector matrices, respectively, wherein S is a diagonal matrix and wherein $V_L$ is either equivalent to V or a subset derived from V; and
constructing the matrix $V_{L\text{-}phase}$ where the $(i,j)^{th}$ element of $V_{L\text{-}phase}$ denotes the phase of the $(i,j)^{th}$ complex element in $V_L$.

9. The transmitter of claim 8, wherein $V_L$ is a subset of V comprising L column vectors corresponding to largest singular values of H.

10. The transmitter of claim 8, wherein the processor is configured to generate $V_{L\text{-}phase}$ by a process comprising:
creating a matrix $H_L$ from selecting L rows of H with largest row-norms; and
constructing the matrix $V_{L\text{-}phase}$ wherein $(i,j)^{th}$ element of $V_{L\text{-}phase}$ represents negative phase of the $(j,i)^{th}$ complex element in $H_L$.

11. The transmitter of claim 8, wherein the processor is configured to generate $V_{L\text{-}phase}$ by a process comprising:
forming a processed channel matrix $H=U^H H$;
creating a matrix $H_L$ from selecting L rows of H with largest row norms; and
constructing the matrix $V_{L\text{-}phase}$ wherein the $(i,j)^{th}$ element of $V_{L\text{-}phase}$ represents the negative phase of the $(j,i)^{th}$ complex elements in $H_L$.

12. The transmitter of claim 7, wherein the processor is configured to construct the precode filter.

13. A receiver, comprising:
at least one antenna transmitting information to a transmitter for constructing a precode filter W, wherein the precode filter is represented by the equation $$W = \sqrt{\frac{P}{L}} V_{L\text{-}phase};$$

wherein:
P: power allocation;
L: number of transmission layers;
$V_{L\text{-}phase}$: a matrix wherein $(i,j)^{th}$ element of $V_{L\text{-}phase}$ is equivalent to phase of $(i,j)^{th}$ complex element in $V_L$, wherein $V_L$ is based on a right singular matrix derived from channel matrix H;
wherein channel matrix H is a matrix representing channel gain between the at least one antenna at the transmitter and at least one antenna at a receiver; and
a processor configured to:
perform channel estimation for the receiver;
construct the channel matrix H, and,
construct the information, wherein the information comprises at least one of $V_{L\text{-}phase}$, right singular matrix V such that $H=USV^H$, a matrix $H_L$ created from selecting L rows of H with largest row norms, wherein $H_L$ is formed from a processed channel matrix $H_P=U^H H$, a matrix $H_L$ created from selecting L rows of H with the largest row-norms.

14. The receiver of claim 13, wherein the processor is configured to construct $V_{L\text{-}phase}$ by:
performing a SVD decomposition of the channel matrix H as $H=USV^H$, wherein U and V are left and right singular vector matrices, respectively, wherein S is a diagonal matrix and wherein $V_L$ is either equivalent to V or a subset derived from V; and
constructing the matrix $V_{L\text{-}phase}$ wherein the $(i,j)^{th}$ element of $V_{L\text{-}phase}$ denotes the phase of the $(i,j)^{th}$ complex element in $V_L$.

15. The receiver of claim 14, wherein $V_L$ is a subset of V comprising L column vectors corresponding to largest singular values of H.

16. The receiver of claim 13, wherein the processor is configured to construct $V_{L\text{-}phase}$ by a process comprising:
creating a matrix $H_L$ from selecting L rows of H with largest row-norms; and
constructing the matrix $V_{L\text{-}phase}$ wherein the $(i,j)^{th}$ element of $V_{L\text{-}phase}$ represents the negative phase of the $(j,i)^{th}$ complex element in $H_L$.

17. The receiver of claim 13, wherein the processor is configured to construct $V_{L\text{-}phase}$ by a process comprising:
forming a processed channel matrix $H=U^H H$;
creating a matrix $H_L$ from selecting L rows of H with largest row norms; and
constructing the matrix $V_{L\text{-}phase}$ wherein the $(i,j)^{th}$ element of $V_{L\text{-}phase}$ represents the negative phase of the $(j,i)^{th}$ complex element in $H_L$.

* * * * *